US011947065B2

(12) United States Patent
Manneschi (10) Patent No.: US 11,947,065 B2
(45) Date of Patent: *Apr. 2, 2024

(54) SYSTEM AND METHOD FOR DETECTION OF ILLICIT OBJECTS IN LUGGAGE (71) Applicant: Alessandro Manneschi, Arezzo (IT)

(72) Inventor: Alessandro Manneschi, Arezzo (IT)

( * ) Notice: Subject to any disclaimer, the term of this patent is extended or adjusted under 35 U.S.C. 154(b) by 336 days.

This patent is subject to a terminal disclaimer.

(21) Appl. No.: 17/426,852

(22) PCT Filed: Jan. 30, 2020

(86) PCT No.: PCT/EP2020/052335
§ 371 (c)(1),
(2) Date: Jul. 29, 2021

(87) PCT Pub. No.: WO2020/157223
PCT Pub. Date: Aug. 6, 2020

(65) Prior Publication Data
US 2022/0107442 A1 Apr. 7, 2022

(30) Foreign Application Priority Data

Jan. 30, 2019 (FR) ...................... 1900853

(51) Int. Cl.
*G01V 11/00* (2006.01)
*G01S 13/88* (2006.01)
(Continued)

(52) U.S. Cl.
CPC ............ *G01V 11/00* (2013.01); *G01S 13/887* (2013.01); *G01V 3/10* (2013.01); *G01V 3/12* (2013.01); *G01N 24/084* (2013.01)

(58) Field of Classification Search
CPC ... G01N 24/084; G01S 13/003; G01S 13/878; G01S 13/887; G01V 11/00; G01V 3/10; G01V 3/12; G01V 8/10
See application file for complete search history.

(56) References Cited

U.S. PATENT DOCUMENTS 5,001,425 A 3/1991 Beling et al.
5,576,621 A * 11/1996 Clements .............. B65F 1/1415
340/568.1

(Continued)

FOREIGN PATENT DOCUMENTS

| CN | 107991327 A | 5/2018 | |
| EP | 3372188 A1 | 9/2018 | |
| WO | WO-2006081615 A1 * | 8/2006 | ........... G01R 33/441 |

OTHER PUBLICATIONS

French Search Report including Written Opinion for Application No. FR 190853, dated Nov. 13, 2019, 13 pages.

(Continued)

*Primary Examiner* — Vinh P Nguyen
(74) *Attorney, Agent, or Firm* — Lerner David LLP (57) ABSTRACT A system for detecting illicit objects contained in a piece of luggage includes a carriage defining a housing for receiving a piece of luggage and examination means placed at the inlet of the housing such that the introduction of the piece of luggage into the housing induces a relative displacement between the piece of luggage and at least one of the examination means and thus an automatic scanning of the piece of luggage by the examination means.

16 Claims, 12 Drawing Sheets (51) Int. Cl.
    *G01V 3/10*         (2006.01)
    *G01V 3/12*         (2006.01)
    *G01N 24/08*      (2006.01)

(56) References Cited

U.S. PATENT DOCUMENTS

| | | | |
|---|---|---|---|
| 5,659,247 A | 8/1997 | Clements | |
| 7,415,094 B2 * | 8/2008 | Johnson | G01N 23/046 378/57 |
| 7,660,388 B2 * | 2/2010 | Gray | G01V 5/0008 378/57 |
| 7,885,380 B2 * | 2/2011 | Foland | G06T 7/00 378/98.12 |
| 8,000,436 B2 * | 8/2011 | Seppi | G01V 5/226 378/57 |
| 9,891,314 B2 * | 2/2018 | Morton | G01S 13/87 |
| 11,280,898 B2 * | 3/2022 | Morton | G01V 3/10 |
| 2012/0121070 A1 * | 5/2012 | Hess | H05G 1/54 250/354.1 |

OTHER PUBLICATIONS

International Search Report including Written Opinion for Application No. PCT/EP2020/052335, dated Apr. 23, 2020, 14 pages.

\* cited by examiner

SYSTEM AND METHOD FOR DETECTION OF ILLICIT OBJECTS IN LUGGAGE

CROSS-REFERENCE TO RELATED APPLICATIONS

The present application is a national phase entry under 35 U.S.C § 371 of International Application No. PCT/EP2020/052335 filed Jan. 30, 2020, which claims priority from French Application No. 1900853 filed Jan. 30, 2019, all of which are hereby incorporated herein by reference.

TECHNICAL FIELD

The present invention relates to the field of detectors designed for the detection of unauthorized objects or substances in an access-protected area.

More particularly, the present invention relates to a detector intended to search for prohibited objects contained in luggage.

The present invention particularly applies to access controls for sites receiving a large public in a short period of time, for example sports venues or sports stadiums or auditoriums.

The invention is however not limited to these particular applications and aims the access control for any site, for example train stations, schools, shops, etc.

TECHNOLOGICAL BACKGROUND

The examination of individuals accessing protected areas has been the subject of many proposals.

Metal detectors are known, in particular walk-through metal detectors using coils which proceed by detection of inductive nature.

Body scanners using microwave-based examination technologies are also known.

In addition of course, physical palpations, by designated operators, of individuals when passing through access doors or areas are known.

There are also known X-ray luggage inspection systems which are very useful for viewing radiopaque, for example metallic, masses but which have strong viewing limitations on the dielectric, even explosive, masses which sometimes have X-ray attenuation characteristics similar to those of the common non-metallic materials. Another drawback of the X-ray scanners is the difficulty of moving them on different use sites because with each new facility they require a verification of the scattered radiation by a competent specialist. In addition, the x-ray scanners for luggage checks are not capable of automatically detecting the metallic weapons and explosives and consequently require an operator at all times for image verification and result in high operating costs. Finally, the maintenance cost is also high because of the need for periodic replacement of the conveyor belt and of the vacuum source of the radiation X.

All known systems however suffer from drawbacks. The reliability of some known systems is sometimes inadequate.

Many known systems are slow, in the sense that they do not allow a large flow or rate of passage of individuals.

In conclusion, the known systems often lead to security problems and to discomfort for the concerned public.

Document US 2012/121070 describes a system for detecting prohibited objects comprising a conveyor configured to receive an object to be inspected and electromagnetic radiation-based detection means, as well as a detector placed at the inlet of the conveyor in order to block or turn off the electromagnetic radiation when an invasive element, such as a hand, is detected. The detector thus allows protecting the operators.

Documents US 2012/121070, EP 3 372 188 and U.S. Pat. No. 5,659,247 describe metal detectors configured to be placed at the entrance of a trash in order to prevent medical staff from accidentally throwing surgical instruments in the trash.

Document CN 107 991 327 describes a locker comprising inspection means and possibly locking means in order to inspect a piece of luggage left in the locker.

SUMMARY OF THE INVENTION

In this context, the present invention aims to propose new luggage analysis solutions optimized to increase reliability, security and flow of individuals.

The invention also aims to avoid the use of ionizing radiation, recognized as being often dangerous for health, in particular for populations formed by children and pregnant women.

The aforementioned aims are achieved according to the present invention thanks to a system for detecting prohibited objects contained in a piece of luggage and an associated detection method in accordance with the appended independent claims. Embodiments are the subject of the dependent claims.

Particularly, the system comprises a trolley defining a housing for receiving a piece of luggage and examination means placed at the inlet of the housing, so that the introduction of the luggage into the housing induces a relative movement between the luggage and the examination means and therefore an automatic scanning of the luggage by the examination means.

As will be understood upon reading the following description, the structure proposed according to the present invention which places the examination means at the inlet of the receiving housing, allows guaranteeing a complete scan of the luggage without requiring a particular instruction to the owner of the luggage, or complex intervention or manipulation from him. The device in accordance with the present invention, moreover proceeding by remote detection without mechanical contact on the luggage, allows guaranteeing the perfect integrity of the luggage.

According to another advantageous characteristic of the invention, the trolley defines an upwardly open cavity for receiving a piece of luggage and entirely encompassing it and examination means placed on and in the walls of the cavity so that the luggage is fully examined by the examination means when they rest on the bottom of the cavity.

Having a cavity that entirely encompasses the luggage allows guaranteeing a complete examination of the entire luggage. But it also allows protecting the luggage during the time when its owner abandons it for examination. This allows reassuring the owner and convincing him to hand over his luggage to the examination device. This also allows at the same time subjecting the owner carrying the luggage to an additional examination, for example subjecting the carrier of the luggage to a walk-through detector, for example a metal detector, in order to detect any unauthorized objects or substances carried by the checked individual.

According to other advantageous characteristics of the invention:
  the housing or cavity has a rectangular parallelepiped geometry,
  the trolley is fitted with casters, the housing or cavity has dimensions at least equal to 460 mm×250 mm×400 mm, and preferably up to 550 mm×300 mm×480 mm, the examination means comprise means using several different technologies, the examination means are chosen from the group comprising: means for detecting metals by induction, microwave means for detecting non-metallic substance, in particular explosives, means for detecting a presence and means for measuring a mass, the examination means preferably comprise means for measuring the dimension of the luggage, the analysis means preferably comprise means for normalizing the signals coming from microwave detectors based on the detected luggage width, the metal detecting means are placed in the long vertical sides of the housing or cavity, the microwave detecting means are composed of at least two series of transmitters/receivers associated with respective cones, disposed on two opposite sides of the housing or cavity, preferably four series of such transmitters/receivers associated with respective cones disposed respectively in the form of two pairs at the level of all the sides of the housing or cavity, more specifically on its opening mouth.

The present invention also relates to a method for detecting prohibited objects contained in a piece of luggage, characterized in that it comprises the step of placing a piece of luggage in a housing of a trolley equipped with examination means placed at inlet of the housing, so that the introduction of the luggage into the housing induces a relative movement between the luggage and the examination means and therefore an automatic scan of the luggage by the examination means.

According to another advantageous characteristic of the invention, the method consists of placing the luggage in an upwardly open cavity to receive a luggage and entirely encompass it, so that the luggage is fully examined by the examination means when it rests on the bottom of the cavity.

According to another advantageous characteristic of the invention, the method implements a trolley equipped with a housing and/or cavity, in combination with a walk-through metal detector adapted to scan the body of an individual.

BRIEF DESCRIPTION OF THE FIGURES

Other characteristics, aims and advantages of the present invention will become apparent upon reading the following detailed description, and in relation to the appended drawings, given by way of non-limiting examples and in which.

DETAILED DESCRIPTION OF ONE EMBODIMENT

The appended figures, in particular FIGS. 1, 2, 3 and 4, show a trolley 10 in accordance with the present invention comprising a frame 20 formed by a set of longitudinal or transverse side members 22 and of uprights 24 equipped with a fairing or cladding 30.

The trolley 10 which has a generally rectangular parallelepiped-shaped shell can be the subject of many embodiments as regards the structure of this frame 20 and of its external fairing 30. It will therefore not be described in detail hereinafter in this regard.

Preferably, the trolley 10 is equipped with handles 40 aiding in its movement and manipulation.

Furthermore, as can be seen in the figures, preferably the trolley 10 is provided at its base and at each of its angles with a blockable and orientable caster 42, in order to facilitate movement of the trolley.

The whole frame 20 and external fairing 30 define at the center of the hollow trolley, an upwardly open housing or cavity 60.

The cavity 60 has preferably the geometry of a rectangular parallelepiped.

The dimensions of the cavity 60 are preferably at least equal to 460 mm in length, 250 mm in width and 400 mm in height and preferably up to 550 mm in length×300 mm in width×480 mm in height.

The Applicant has determined that these dimensions were optimal for accommodating by fully encompassing all the luggage capable of being carried and used by individuals likely to access a wide spectrum of public sites, such as sports or performance sites.

The housing or cavity is delimited by a bottom wall 69 and at least one side wall. The at least one side wall comprises a lower portion connected to the bottom wall and an upper portion opposite the lower portion and forming a through opening.

For example, the housing can be delimited by four side walls 62, 64, 66, 68. The bottom wall 69 and the at least one side wall 62, 64, 66, 68 are disposed on the inside of the fairing and are preferably planar and of rectangular contour: two walls 62, 64 extend longitudinally and vertically parallel to each other, and two walls 66, 68 extend transversely and vertically parallel to each other and orthogonally to the aforementioned walls 62, 64. The side walls are furthermore generally perpendicular to the horizontal bottom wall 69.

As previously indicated, the trolley 10 is equipped with examination means using a plurality of technologies. It is according to the invention non-contact examination technologies. This allows guaranteeing the total integrity of the luggage and carrying out its full analysis without requiring the opening of the luggage.

Still more specifically, preferably, the trolley 10 in accordance with the invention comprises metal detecting means 100, microwave-based means 200 adapted for the identification of materials contained in the examined luggage, in particular of explosives, means 300 for measuring the mass of the luggage and, where appropriate, means for detecting the presence of a luggage in the cavity 60 and/or for measuring the dimensions of the luggage.

The metal detecting means 100 are preferably formed of coils proceeding by inductive detection, placed in vertical side panels 32, 34 of the trolley, located parallel to the longitudinal walls 62, 64 between them and the external fairing 30. The coils placed in the panels 32, 34 are alternately transmitting and receiving coils to emit a magnetic field and detect the influence of metal parts located in the checked luggage, in particular by emission of eddy current during the relative movement between the luggage and the coils and/or by modification of the frequency and of the phase of the detected magnetic field.

The technology of such metal detectors is well known per se to those skilled in the art and will therefore not be described in detail hereinafter.

Preferably, the panels 32, 34 and the coils integrated into these panels cover at least the entire surface of the longitudinal walls 62, 64 of the cavity 60 to ensure a complete examination of the luggage.

However, each coil may be composed of several turns each individually covering only part of the surface of these walls 62, 64.

The microwave-based means 200 for detecting substances and in particular explosives are preferably formed of a plurality of microwave transmitting/receiving means 202 associated with cones forming respective antenna 204.

The means 200 are thus disposed in the form of two pairs of sets of transducers 210, 212 and 220, 222 disposed respectively oppositely. A first pair of sets of transducers 200, referenced respectively 210 and 212, are placed oppositely on the longitudinal walls 62, 64 of the cavity 60. A second pair of sets of transducers 200, referenced respectively 220 and 222, is placed oppositely on the transverse walls 66, 68 of the cavity 60.

By way of non-limiting example, a row 210, 212 of five microwave transmitting/receiving transducers 202 may be provided on each of the two long sides 62, 64 of the trolley and a row 220, 222 of three microwave transducers 202 on each of the two short sides 66, 68 of the trolley.

Figure 1:
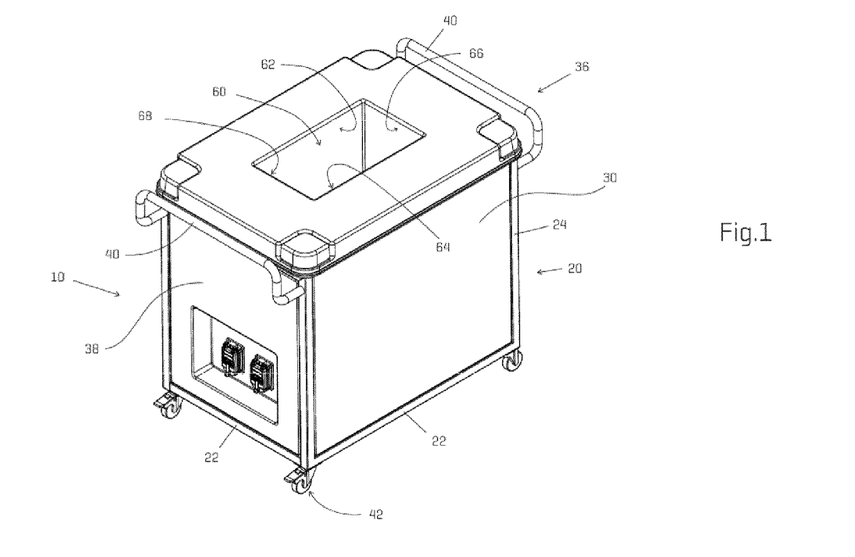
FIG. 1 represents a perspective view of a trolley in accordance with the present invention.
Figure 2:
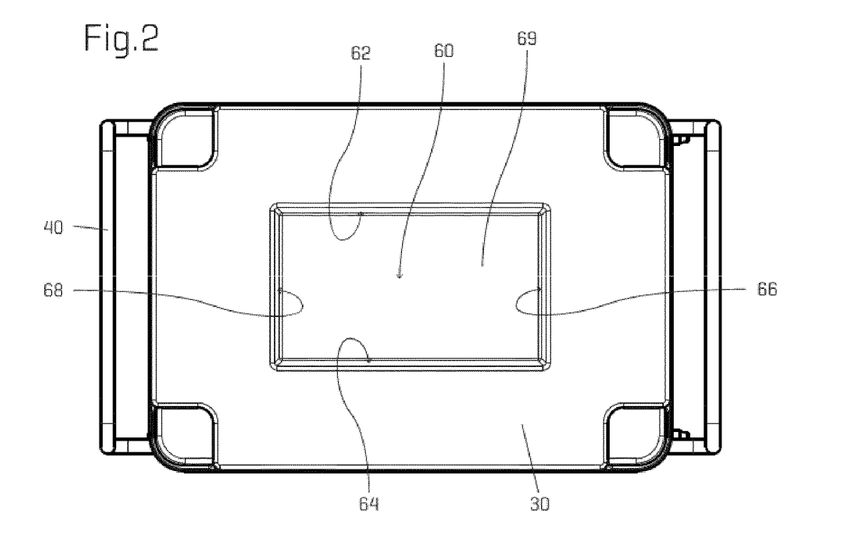
FIGS. 2, 3 and 4 represent respectively three top and lateral front and lateral side views of the trolley illustrated in FIG. 1.
Figure 3:
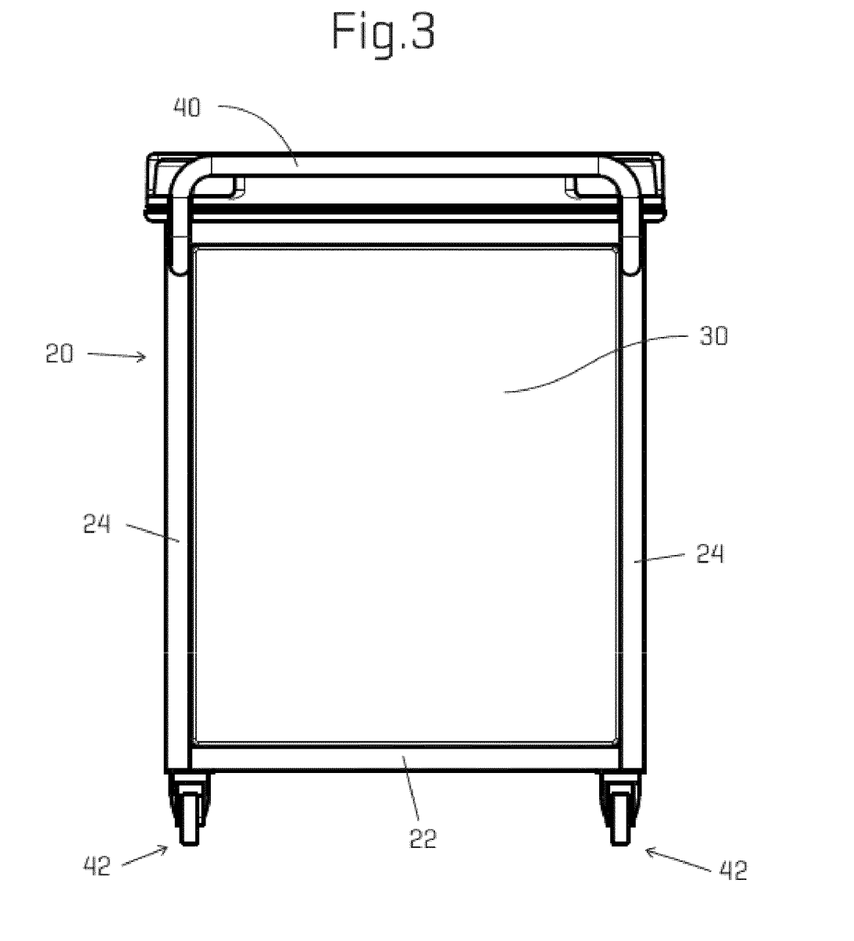
Figure 4:
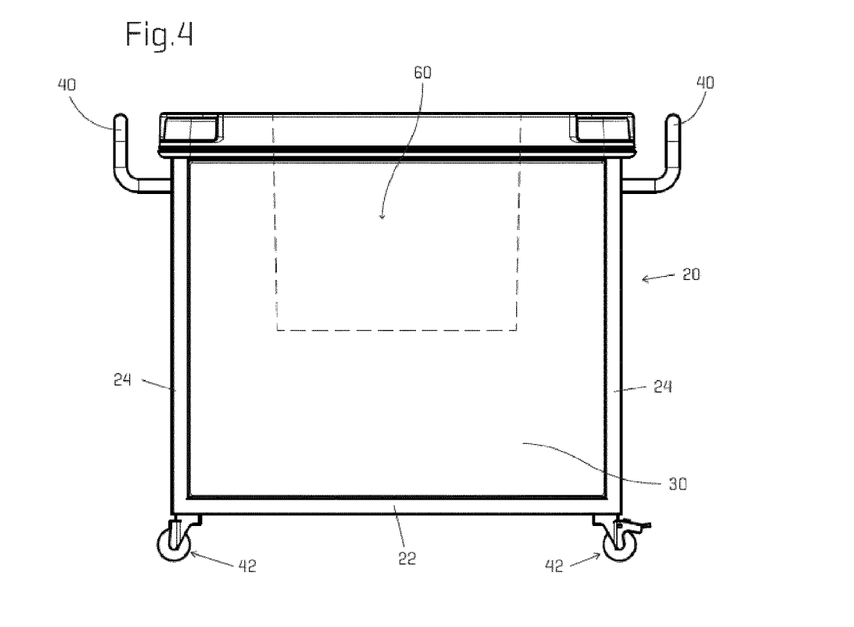
Figure 5:
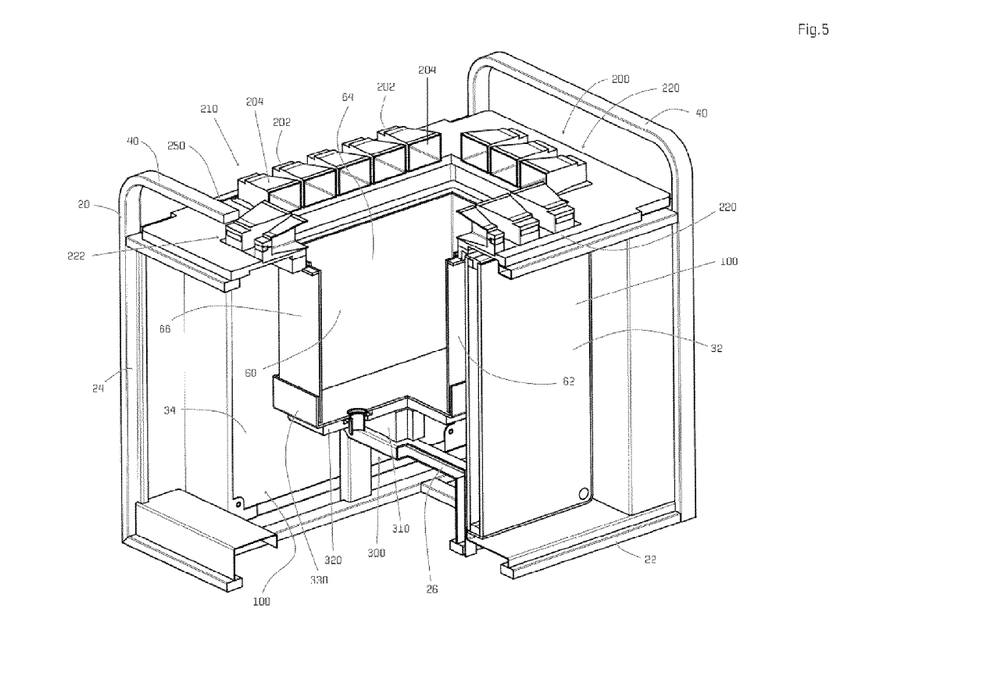
FIG. 5 represents a partial exploded view of a trolley in accordance with the present invention highlighting some of the examination elements integrated into the trolley.
Figure 6:
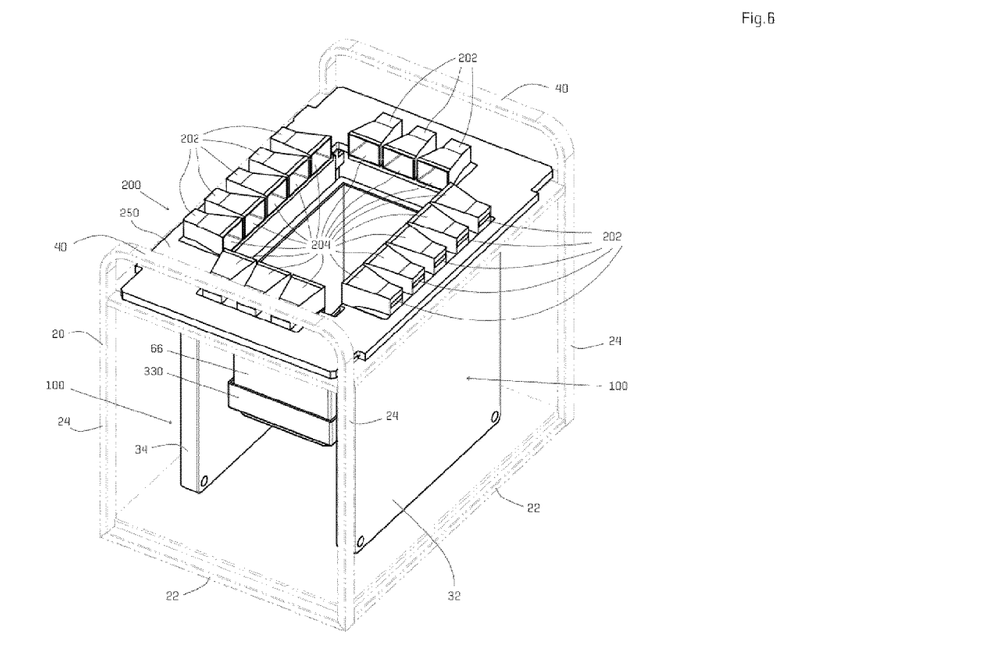
FIG. 6 represents another exploded view of the trolley in accordance with the present invention.

Still more specifically, as can be seen in the appended figures, in particular in FIGS. 5 and 6, these microwave transducers 202 associated with a respective cone 204 are disposed at the opening contour of the cavity 60, namely at its top. Thus, when a piece of luggage is introduced into the cavity 60, it is moved facing the transducers 200 so that the introduction of the luggage into the housing 60 induces a relative movement between the luggage and these examination means 200 and therefore an automatic scanning of the entire luggage by the examination means 200. This scanning is carried out without requiring a particular instruction to the owner of the luggage, nor a complex intervention or manipulation from him.

More specifically in FIGS. 5 and 6, 202 refers to each of the transducer means successively forming microwave transmitters/receivers strictly speaking, associated with a focusing cone 204.

The transducers 202 preferably operate in a frequency range comprised between 5 and 30 GHz and very preferably between 12 and 20 GHz.

The different transducers 202 located on one side of the opening contour of the cavity 60 are located respectively coaxially with a transducer 202 located oppositely on the opposite panel.

Each transducer 202 can, under the monitoring of a central unit, work alternately as a transmitter or a receiver or as a transmitter and a receiver.

The rays transmitted between a transmitter 202 located on a first panel in the direction of a receiver 202 located on the opposite panel, which are not concealed by an interposed piece of luggage or object, reach the receivers with a slight delay due to the transmission in the air, without appreciable attenuation in amplitude.

However, the rays emitted by a transmitter 202 in the direction of an object or a piece of luggage can be stopped or attenuated thereby and cannot reach the facing receiver 202 without alteration.

The control of the transmitting/receiving pairs 202 and of the analysis of the signals coming from a receiver 202, therefore allows detecting the presence of a particular piece of luggage and/or object within the luggage, not permeable to micro-waves.

Depending on the nature of the materials interposed in the path of the microwave beams, some of the microwave radiation may be reflected towards the emitter, in particular in the presence of some metals.

The microwave rays which are transmitted between a transmitter 202 and a receiver 202, without being concealed by a luggage or an object not permeable to microwaves, reach the facing receiver 202 practically without delay and without appreciable attenuation in amplitude, the delay depending only on the speed of the microwaves in the air.

When the material interposed in the path of a microwave radiation is only partially opaque to microwaves, the different interfaces of this material can generate successive echoes which are reflected towards the transmitter with different delays and the portion transmitted of the same radiation reaches the receiver with a delay and an attenuation which are a function of the complex dielectric constant of the material, of the frequency of the wave and of the thickness of the material crossed by the wave.

The analysis of the signals thus detected on the receivers 202, relative to reference signals, allows detecting fraudulent objects introduced into an examined luggage and determining their nature.

Those skilled in the art indeed understand that the detection of fraudulent non-metallic substances, for example explosives or drugs, housed in a bag, can be carried out by detection of the delay and of the amplitude of the microwave signals transmitted through the substance and/or reflected by the substance.

The analysis means in accordance with the invention preferably proceed by comparison of the transmitted and/or reflected signals, with values of signals transmitted in the air and/or signals reflected on luggage walls made of a known non-dangerous material or reference signals obtained by examination of test materials of known nature.

The analysis means are adapted to generate an alarm when a significant deviation exceeding a threshold is detected relative to the reference values.

The analysis means are preferably adapted to carry out at least one of the following steps, and preferably the combination of all of the following steps:

measuring the delay and amplitude of a direct microwave transmission between each pair of coaxial transmitters and receivers 202 located on two opposite panels, measuring the delay and the amplitude of the microwave wave emitted by each transmitting transducer 202 and reflected towards the same transducer forming a receiver 202, detecting the presence of a double microwave wave echo reflected by a fraudulent substance, comparing the microwave waves transmitted directly with a reference value of transmission in vacuum and transmission of an alarm in case of detection of a delay greater than a threshold and with an amplitude corresponding to a range of substance which delays and attenuates the microwaves.

The analysis means can in particular comprise a processor, microprocessor, microcontroller type computer, etc. configured to execute instructions.

The method in accordance with the invention can use the comparison of a detected double echo with transmission values in vacuum and the generation of an alarm in case of detection of a delay greater than a threshold between the peaks of the two echoes with an amplitude greater than a threshold (representative of a substance which reflects part of the wave (first echo) and which delays and attenuates the non-reflected signal (second echo).

Within the scope of the invention, the microwave transmitting and microwave receiving means 202 can furthermore be adapted to use not only the signal coming from a coaxial receiver 202 located oppositely but also to use the signals coming from the other transmitters/receivers 202, framing the facing coaxial transmitter.

Within the scope of the invention, the housing or cavity 60 can furthermore be equipped with means for detecting the presence of a piece of luggage in the housing or cavity 60.

Such detection means can be formed based on optical transmitter/receiver cells.

Such means can also consist of infrared detecting means.

Still more specifically, such infrared transmitting/receiving means can be used by using the round trip time of an infrared radiation reflected by a piece of luggage to measure the dimensions of the piece of luggage placed in the housing or cavity 60.

Knowing the thus detected dimensions of the luggage, the analysis means can carry out a normalization of the analysis that is to say of the output signal coming from the microwave transducers 200, and/or of the signal coming from the metal detector, relative to a standard width size unit.

This normalization, which allows knowing the microwave absorption properties of the material detected for a standard space or unit dimension value, allows improving the reliability of the system by improving the quality of the detection of the nature of the material present in the luggage.

To this end, it is possible to provide several pairs of infrared transmitting means and associated infrared receiving means placed on each side of the cavity 60 so that the infrared rays emitted by each infrared transmitting means are reflected on a piece of luggage before reaching the associated infrared receiving means placed on the same side of the cavity.

Figure 7:
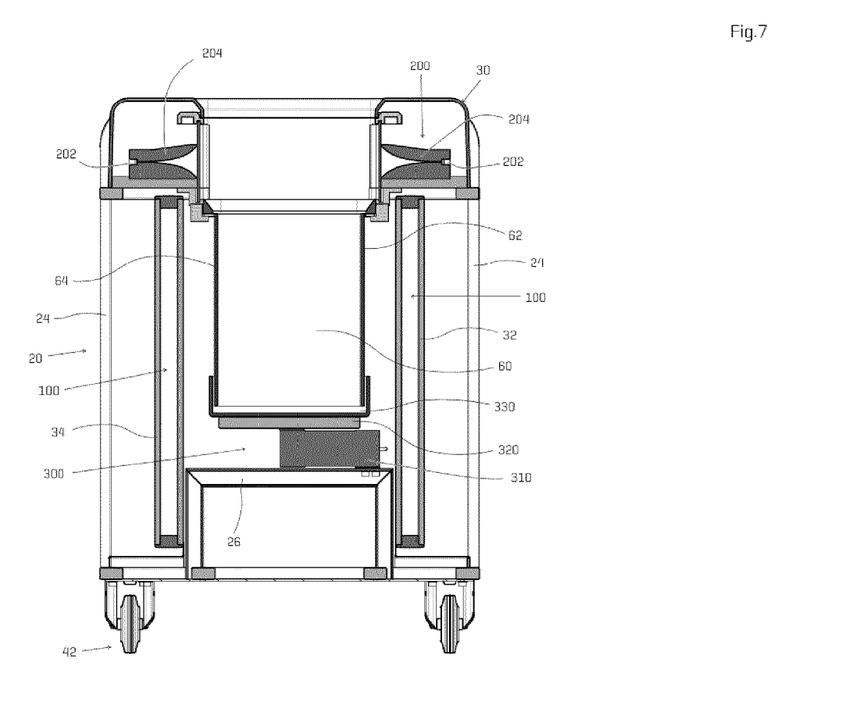
FIG. 7 represents a schematic vertical sectional view of a trolley in accordance with the present invention, along a transverse section plane.
Figure 8:
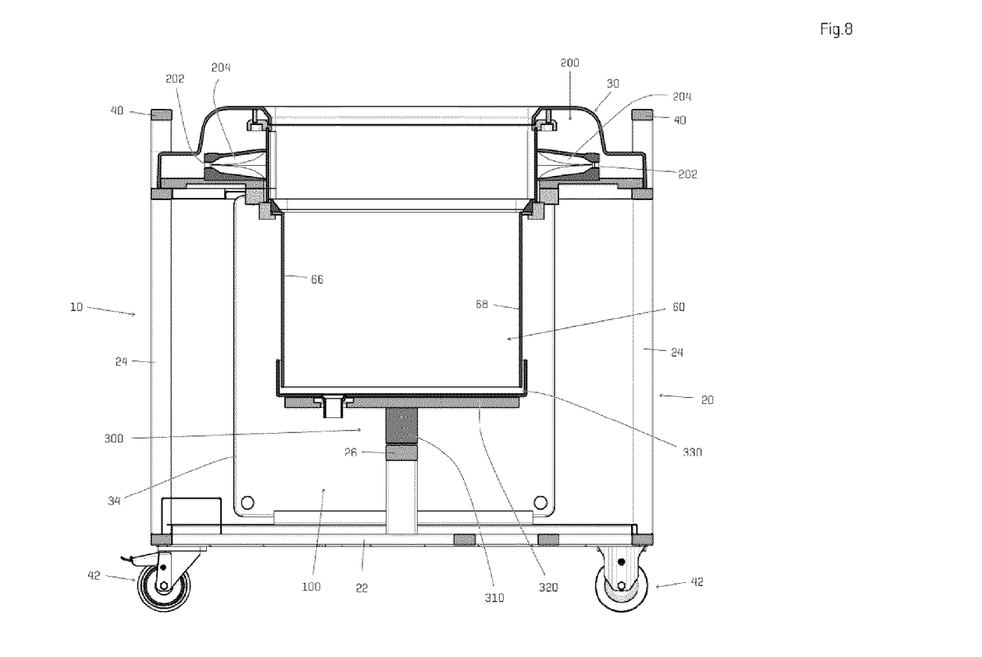
FIG. 8 represents a second vertical sectional view of the same trolley along a longitudinal section plane orthogonal to that of FIG. 7.

As indicated above, the trolley 10 in accordance with the present invention is preferably furthermore equipped with weighing means that allow knowing the mass of the luggage introduced into the cavity 60. These means are illustrated in particular in FIGS. 7 and 8.

These mass measuring or weighing means can also serve as a detector of the presence of the luggage in the cavity 60.

This mass can also be used to normalize the signals detected by the metal detector integrated into the panels 32 to 34, as well as the output signal from the microwave transducers 200.

The weighing means may be the subject of many embodiments.

Preferably, these means 300 comprise, as illustrated in FIGS. 5, 6, 7 and 8, a strain gauge 310 interposed between a support 26 secured to the base of the trolley 10 and a horizontal plate 320 connected to the bottom 330 of the cavity, which bottom 330 is capable of vertical displacement relative to the vertical walls 62, 64, 66 and 68 of the cavity 60.

The plate 320 is secured to the aforementioned bottom wall 69 of the cavity 60.

Figure 9:
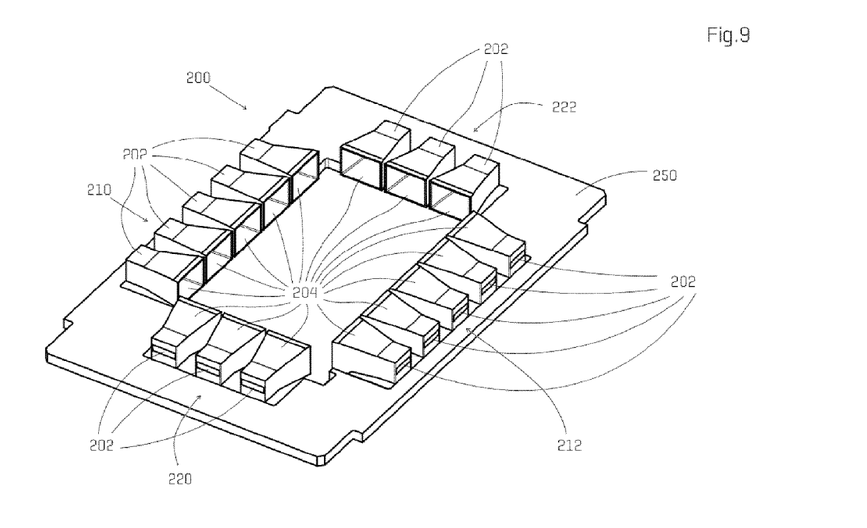
FIG. 9 represents a perspective view of a planar support supporting transmitters/receivers and associated microwave cones in accordance with the invention as well as a central analysis unit, FIG. 10 schematically represents the main steps of the detection method in accordance with the present invention, FIG. 11 schematically represents the implantation of a trolley in accordance with the present invention in combination with a walk-through metal detector.

FIG. 9 represents a base 250 which carries the four matrices 210, 212, 220 and 222 of microwave transducers 202 associated with respective focusing cones 204. This base 250 can carry the central signal processing unit.

The trolley in accordance with the present invention can be equipped with any additional useful detection means, for example means for sampling and analyzing substance, vapor or particle traces and/or analysis means of the nuclear magnetic resonance type, means for analyzing complex impedance and/or means for detecting radioactive radiation.

Such means are known per se in their general structure and will therefore not be described in more detail hereinafter.

The trolley in accordance with the present invention can be provided with sound or light-type signaling means to generate alarms.

The analysis means in accordance with the present invention are preferably adapted to program the sensitivity of the metal detecting means 100 and of the microwave detecting means 200.

Programming of the metal detecting means 100 allows in particular selectively adjusting the sensitivity for a detection of a magnetic and/or non-magnetic metal composition. It also allows monitoring the sensitivity based on the threshold size selected for the metallic objects sought.

It is the same for the adjustment of the sensitivity of the microwave transducers 200 which allows adapting the detection to the dielectric characteristics sought, in particular those of explosives.

The detection trolley 10 in accordance with the present invention can advantageously be combined with a walk-through metal detector G.

This configuration has been illustrated in FIGS. 11 to 16.

Figure 11:
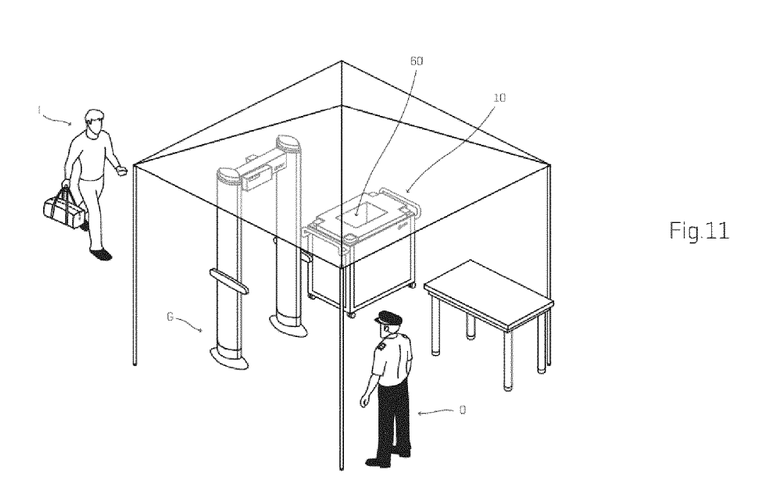

FIG. 11, indeed shows a trolley 10 placed adjacent to a walk-through metal detector G.

Such a walk-through metal detector G is known per se. It will therefore not be described in detail thereafter.

It will be noted that preferably the trolley 10 is oriented with its large dimension perpendicular to the transit direction through the walk-through detector G as illustrated in FIGS. 11 to 16.

This configuration allows minimizing the electromagnetic coupling between the walk-through detector G and the inductive detection transmitting/receiving means integrated into the trolley 10 for luggage examination. This disposition also allows facilitating the insertion and removal of a piece of luggage into the cavity 60 on the side of the walk-through detector G by a person in transit through this walk-through detector.

FIG. 11 shows an individual I equipped with a piece of luggage B approaching a checkpoint.

Figure 12:
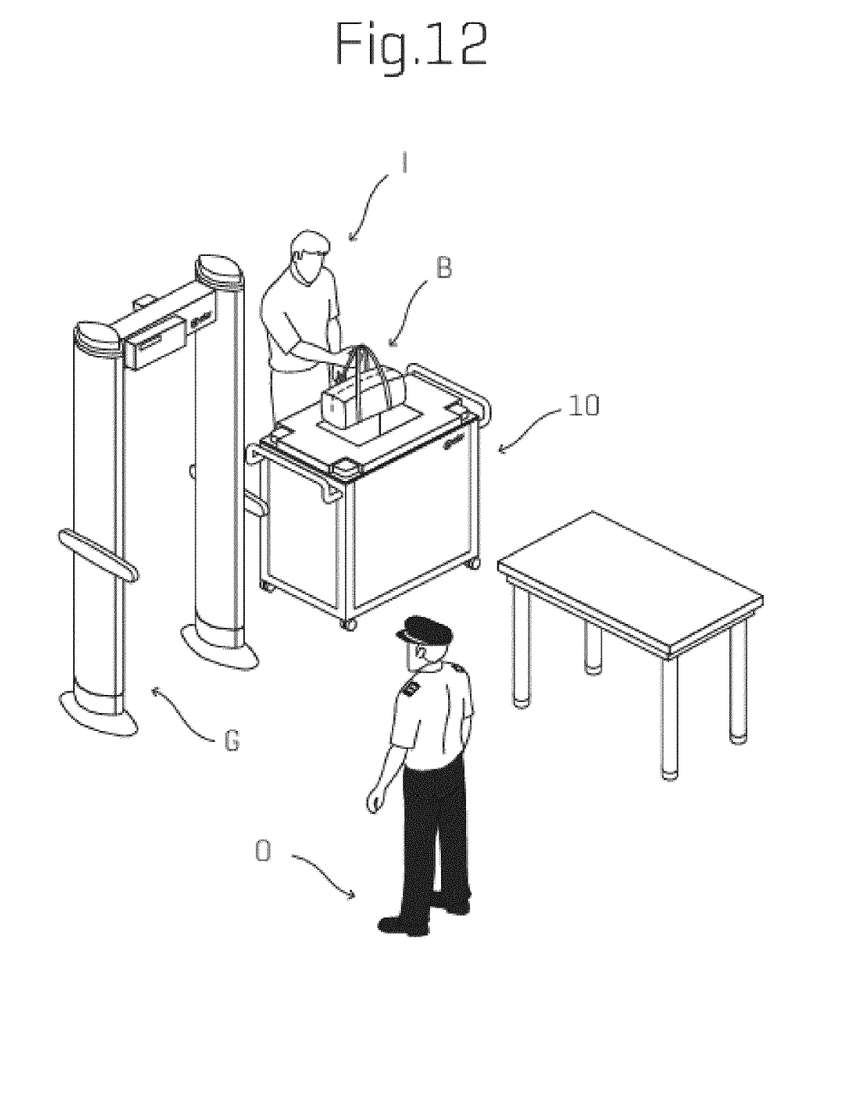
FIGS. 12, 13, 14, 15 and 16 represent five successive steps of using the trolley in accordance with the present invention.

FIG. 12 represents the individual I introducing the luggage B into the cavity 60 of the trolley 10 in accordance with the invention.

Figure 13:
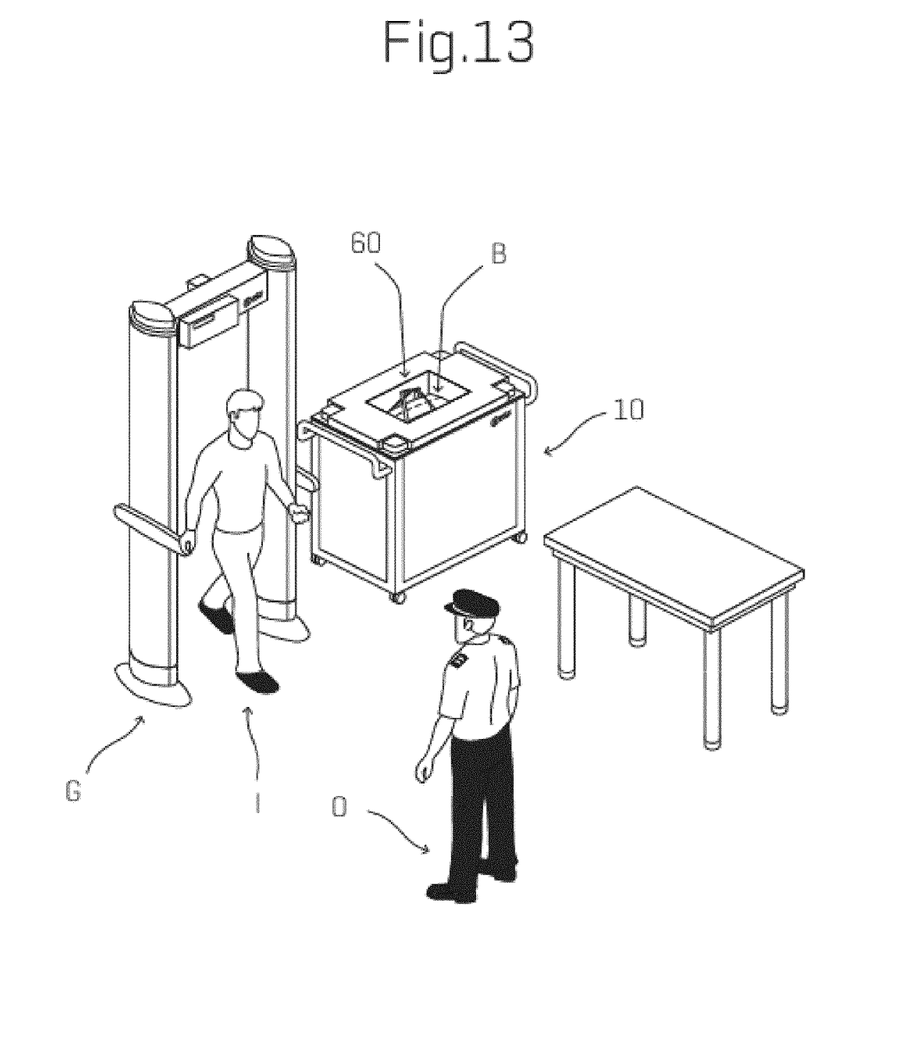

FIG. 13 shows the individual I passing through the walk-through detector G. During this step, the luggage B placed in the cavity 60 is automatically analyzed by the analysis structure in accordance with the invention integrated into the trolley 10.

Figure 14:
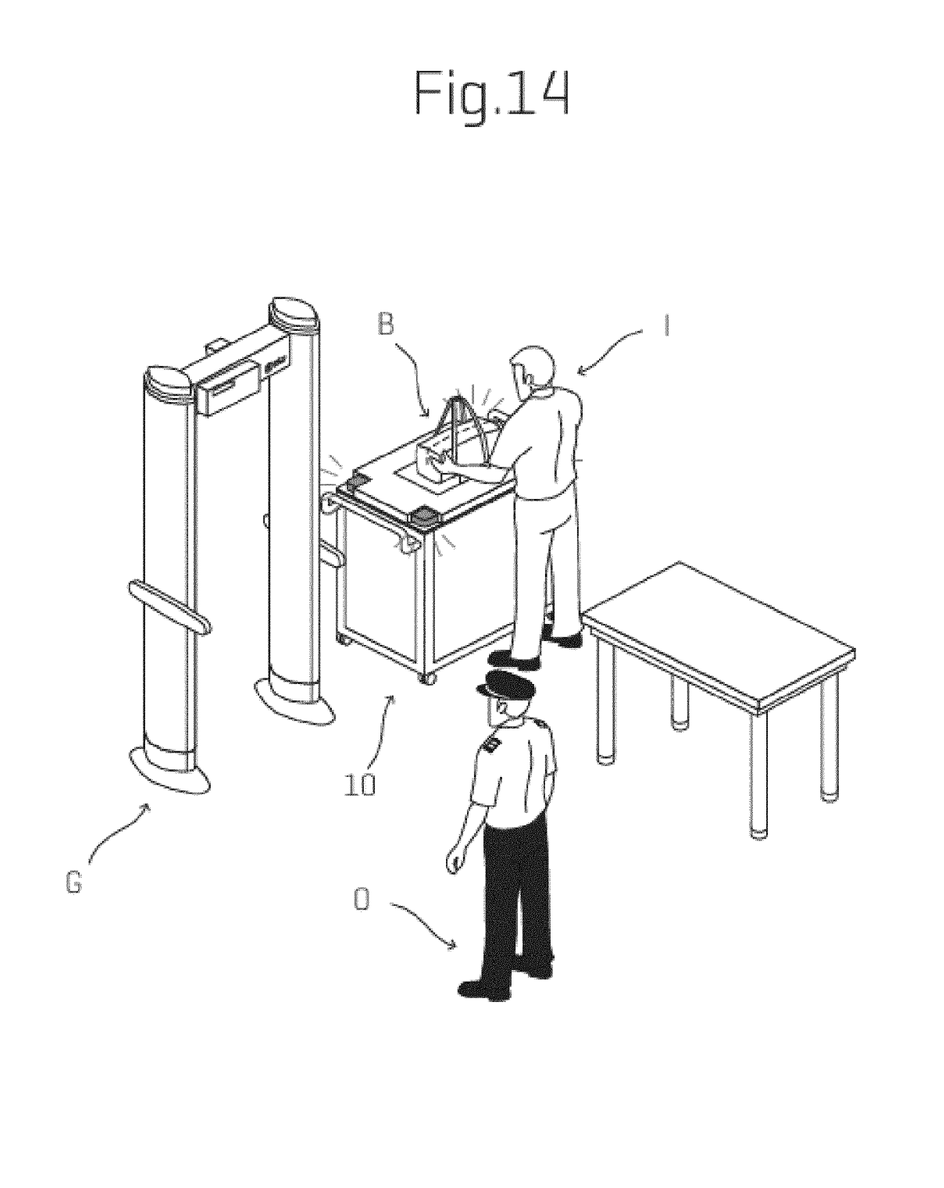

FIG. 14 represents the individual I retrieves his luggage B after having passed through the walk-through detector G in case of non-detection of a suspicious object in the luggage B by the trolley 10.

Figure 15:
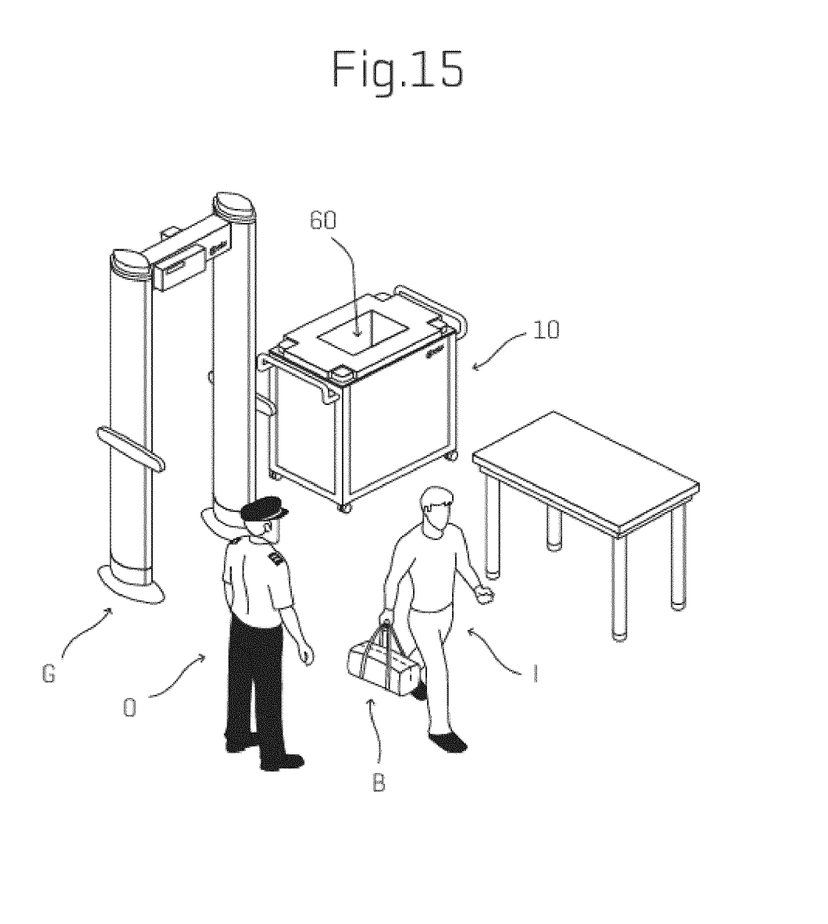

FIG. 15 shows the individual I leaving in this case the check area.

Figure 16:
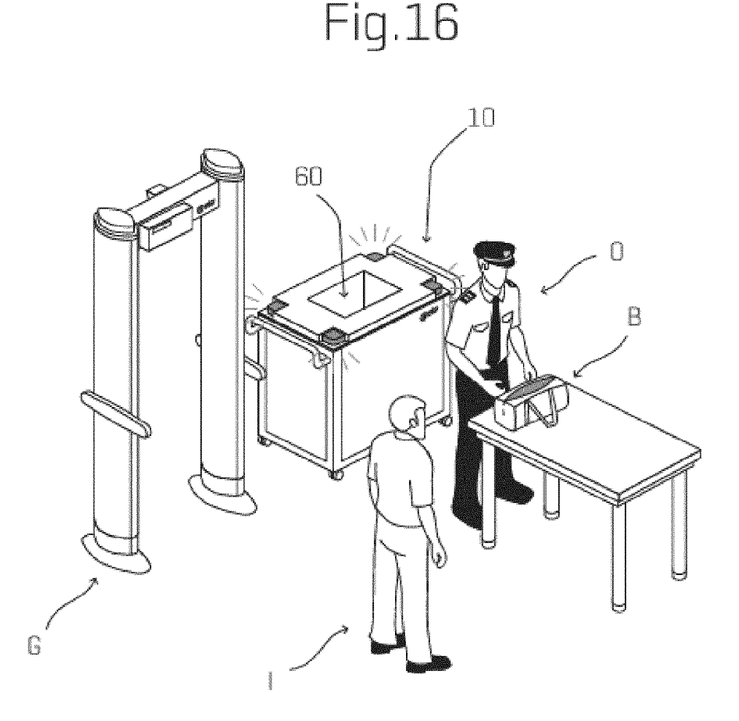
Figure 17:
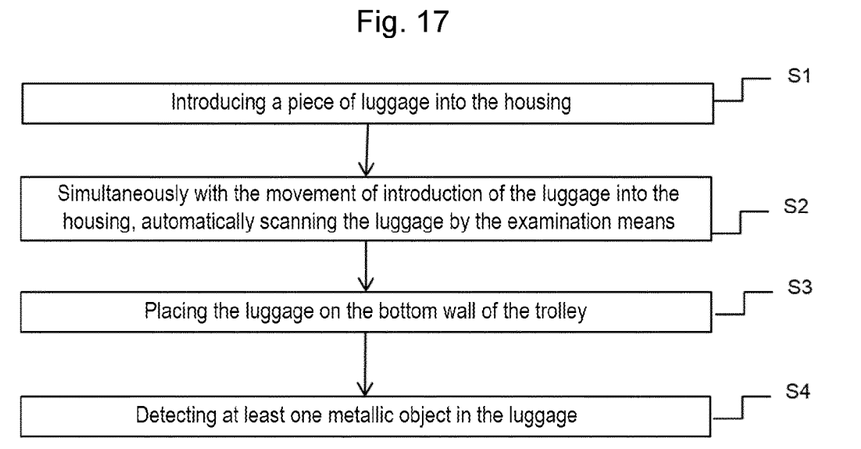
FIG. 17 is a flowchart illustrating steps of an example of a detection method according to one embodiment of the invention.

On the contrary, FIG. 16 shows an operator O carrying out an examination of the luggage B after the step of FIG. 13 when the trolley 10 in accordance with the invention has generated an alarm signaling the suspicious presence of a potentially dangerous object in the luggage B.

The trolley 10 in accordance with the present invention offers in particular the following advantages:
the trolley 10 can be of low energy consumption,
the trolley 10 can be equipped with low-voltage analysis means and with a rechargeable electric battery making the trolley autonomous.

The trolley 10 in accordance with the invention does not comprise a movable technical or mechanical portion for the examination of the luggage B and therefore has great reliability.

The trolley 10 in accordance with the invention does not use ionizing radiation and is therefore perfectly safe for the examined populations as well as for the nearby operators.

The trolley 10 in accordance with the invention allows simple and comfortable use for both checked individuals I and professional operators O.

The trolley 10 does not require, except for an alarm, assistance or an operator.

According to another advantageous characteristic of the invention, the trolley 10 in accordance with the invention can be equipped with plastic trays or interchangeable plastic bags in the cavity 60 for receiving the luggage B to be checked in order to facilitate maintenance and cleanliness operations.

The microwave analysis means preferably proceed by measuring the complex dielectric constant.

Figure 10:
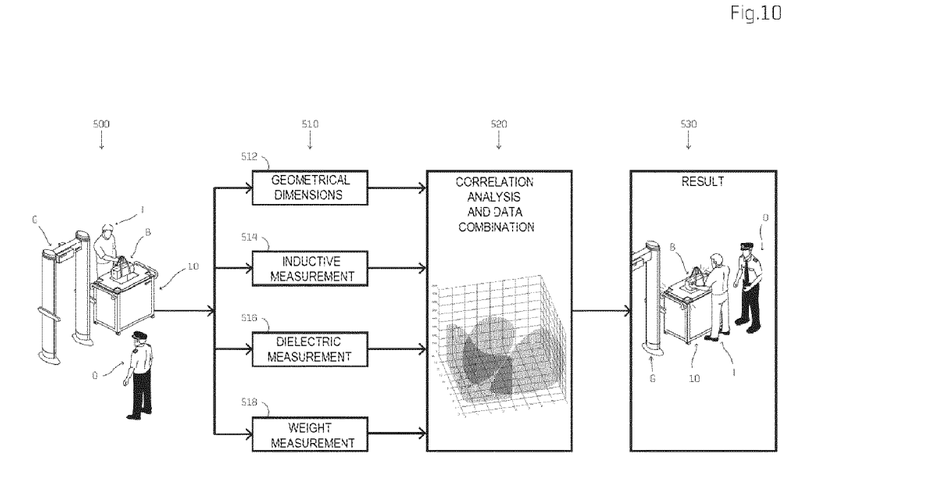

As can be seen in FIG. 10, all the measurements made by the examination means 100, 200 integrated into the trolley 10, during a step 500, namely the geometric dimensions 512 of the luggage B, the result 514 of the inductive measurement from the metal detecting means 100, the result 516 of the analysis from the microwave detecting means 200 detecting the dielectric parameters of the objects contained in the luggage B and the weight measurement 518, thus collected during a step 510, allow, through a correlation search carried out during a step 520, knowing the location, the geometry and the dimensions of suspect materials, in particular metallic objects and/or dangerous substances such as explosives and delivering if necessary an alarm during a step 530.

Of course, the present invention is not limited to the embodiments which have just been described, but extends to all alternatives in accordance with its spirit.

It is recalled that the invention allows guaranteeing a full scan of the luggage without requiring a particular instruction to the attention of the owner of the luggage, or a complex intervention or manipulation from him or a specialized operator, thanks to the disposition of the examination means at the inlet of the receiving housing.

It is also recalled that the invention allows guaranteeing the perfect integrity of the luggage.

Finally, it is recalled that the invention allows guaranteeing a full examination of the totality of the luggage and protecting the luggage during the time when its owner abandons it to allow the examination, since the cavity is adapted to entirely encompass the luggage.

The invention claimed is:

1. A detection system comprising:
a trolley defining a housing, the trolley comprising a bottom wall configured to receive a piece of luggage, at least one side wall comprising a lower portion connected to the bottom wall and an upper portion opposite the lower portion, the bottom wall and the at least one side wall together delimiting the housing, the housing being open at the upper portion of the at least one side wall so as to form an opening that allows introduction of the piece of luggage inside the housing, the opening being opposite to the bottom wall; and
analysis means comprising a plurality of microwave transducers placed at the upper portion of the at least one side wall so that introduction of the piece of luggage into the housing through the opening and placement of said piece of luggage on the bottom wall induces a relative movement between the piece of luggage and the analysis means and therefore an automatic scan of the piece of luggage by the analysis means.

2. The detection system of claim 1, wherein the opening is configured to allow introduction of the piece of luggage into the housing.

3. The detection system of claim 1, wherein the housing is configured to entirely encompass the piece of luggage and the analysis means are placed at the upper portion of the at least one side wall to automatically scan the whole piece of luggage upon introduced of the piece of luggage into the housing.

4. The detection system of claim 1, wherein dimensions of the housing are at least equal to 460 mm×250 mm×400 mm.

5. The detection system of claim 1, wherein the housing is of rectangular parallelepiped geometry.

6. The detection system of claim 1, wherein the analysis means further comprise detection means which are distinct from microwave transducers.

7. The system according of claim 1, wherein the analysis means further comprise at least one of the following detection means: metal detecting means, mass detecting means, presence detecting means.

8. The detection system of claim 1, wherein the at least one side wall comprises two pairs of opposite walls and the microwave transducers are arranged at least at two opposite walls.

9. The detection system of claim 1, wherein the microwave transducers comprise microwave transmitters and focusing cones.

10. The detection system of claim 1, wherein the microwave transducers are placed over an entire periphery of the opening of the housing.

11. The detection system of claim 1, wherein the at least one side wall comprises two pairs of walls and the analysis means further comprise inductive coils placed at two opposite walls for metal detection.

12. The system according to claim 1, wherein dimensions of the housing are up to 550 mm×300 mm×480 mm.

13. A detection method comprising the following steps:
introducing a piece of luggage through an opening of a housing of a detection system, wherein the detection system comprises a plurality of microwave transducers placed at an upper portion of the housing adjacent the opening; and
placing the piece of luggage onto a bottom wall of the housing, the bottom wall being opposite to the opening and the upper portion of the housing such that the piece of luggage is automatically scanned by the microwave transducers when the piece of luggage is introduced into the housing.

14. The detection method of claim 13, wherein, during the introduction step, the piece of luggage is completely introduced into the housing.

15. The detection method of claim 13, further comprising detecting at least one metal object in the piece of luggage.

16. A detection system comprising:
a trolley defining a housing, the trolley comprising a bottom wall configured to receive a piece of luggage, at least one side wall comprising a lower portion connected to the bottom wall and an upper portion opposite the lower portion and forming a through opening, the bottom wall and the at least one side wall together delimiting the housing and the bottom wall being fixed with respect to the side wall; and
analysis means comprising a plurality of microwave transducers placed at the upper portion of the at least one side wall so that introduction of the piece of luggage into the housing through the opening to place the piece of luggage onto the bottom wall induces a relative movement between the piece of luggage and the analysis means and therefore an automatic scan of the piece of luggage by the analysis means.

* * * * *